United States Patent [19]
Swenson

[11] 3,827,821
[45] Aug. 6, 1974

[54] AXIALLY ACTUATED BACK SPOT FACING TOOL

[76] Inventor: Henry F. Swenson, 22 Holmehill Ln., Roseland, N.J. 07068

[22] Filed: Apr. 9, 1973

[21] Appl. No.: 348,924

[52] U.S. Cl............... 408/59, 408/159, 408/180, 408/187, 51/220
[51] Int. Cl..................... B23b 51/00, B23b 51/06
[58] Field of Search............. 408/180, 187, 159, 59

[56] References Cited
UNITED STATES PATENTS
2,404,027  7/1946  Belanger........................... 408/187
3,572,182  3/1971  MacDonald....................... 408/187

Primary Examiner—Francis S. Husar
Attorney, Agent, or Firm—Ralph R. Roberts

[57] ABSTRACT

This invention pertains to a back spot facing tool whose cutting blade is pivotally mounted on a spindle body and is axially actuated by a plunger rod so as to be moved to either a cutting or a concealed condition in response to either a manual manipulation or to a hydraulic actuation of this rod. The back spot facing cutting blade is mounted with its retaining pivot point offset so that one side of the blade in a cutting condition extends a greater distance from the spindle body causing a greater pressure to be exerted on this blade cutting portion than on the opposite side blade cutting portion. The blade portion developing the greater pressure is supported by an adjustable set screw which is adjusted to provide means to establish the exact face angle of back spot face cutting desired by the tool. A precise grinding fixture is also disclosed and carries the blade at a determined condition to its support surface so as to establish the desired cutting blade angles.

10 Claims, 10 Drawing Figures

PATENTED AUG 6 1974

AXIALLY ACTUATED BACK SPOT FACING TOOL

BACKGROUND OF THE INVENTION

1. Field of the Invention

With reference to the classification of art as presently established in the United States Patent Office this invention is found in the general Class entitled, "Cutting By Use of Rotating Axially Moving Tool" (Class 408) and the subclass thereunder entitled, "tool pivotally mounted on support" (subclass 159) or the subclass entitled, "tool support with means to permit positioning of the tool relative to support-pivotal tool" (subclass 187).

2. Description of the Prior Art

Cutting tools and particularly back spot facing tools are well known and particularly those that are provided with one or two cutting faces. In general, the back spot facing tools as used in high production and for automatic positioning require either a manual or a hydraulic means for opening and closing of a cutting blade. In conventional construction the cutting blade is pivoted in and out of position by swinging in and out of the spindle body of the boring bar. These blades are customarily symmetrically mounted around the pivot point. Tools of this particular nature are seen in U.S. Pat. No. 2,438,558 to HOLLANDER as issued on Mar. 30, 1948; U.S. Pat. No. 2,959,109 to BUCHAN as issued on Nov. 8, 1960 and U.S. Pat. No. 3,572,182 to MACDONALD as issued on Mar. 23, 1971. In these and in other known tools the blades are carried by the spindle body and pivoted into position for the back spot facing operation. However, in the flat facing tool to HOLLANDER and in the tool to MACDONALD, as in other back spot facing tools as presently known, there is no provision for adjustability of the back spot facing tool so that compensation for sharpening and the like is accomplished by an adjustable setting of the tool by means of a screw adjustment. In the present invention as provided by the applicant the back spot facing blade is pivotally carried in the tool spindle body. The pivot means for the blade is offset so that a larger cutting area or length is made by one face of the blade then by the other or opposite face. The larger cutting extent on one side of the blade insures that a maximum pressure is provided by this cutting surface. This side of the cutting blade is adjustably supported by a threaded screw carried in the end of the spindle body with the screw adjusted to compensate for wear or to establish a cutting face angle in accordance with the back spot facing requirement.

SUMMARY OF THE INVENTION

This invention may be summarized at least in part with reference to its objects.

It is an object of this invention to provide, and it does provide, a back spot facing tool having a pivoted cutting blade which is pivotally offset so that in its cutting condition one side of the blade and its cutting edge projects a greater distance than the other side, the tool being actuated by an axially movable cam rod.

It is an object of this invention to provide, and it does provide, a back spot facing tool having a pivoted cutting blade which is pivotally retained so that in a cutting condition one side of the blade extends a greater distance with a cutting edge which is greater than the other side and with this side of the blade supported by an adjustable stop to precisely position the cutting face angle of the blade.

Two embodiments of the tool of this invention are depicted. In both embodiments the back spot facing blade is pivotally supported and is moved in and out of a slot in the spindle body by means of a cam contoured plunger rod. At one limit the rod engages the blade so as to bring the blade to an open condition. The plunger rod when moved to the other limit by an attached collar causes the cam surface to engage the cutting blade to rotate this blade into a closed condition in which position the blade is disposed for insertion or withdrawal of the spindle body and blade through a hole which is to be spot faced. In one embodiment the actuation is mechanical and in the other embodiment there is provided a similar-type construction except that the tool uses the pressurized hydraulic cutting field to actuate a cylinder. At this same time provision is made so that the cutting fluid may be directed to the cutting edges to lubricate the cutting blade when the blade is swung to a back spot facing condition. The pressurized cutting fluid is used to move a piston and attached rod to cause the blade to be swung into the selected cutting position and in this position the blade is adapted to perform the back spot facing operation. Movement of the rod in the other direction causes the blade to be released and swung to a concealed condition.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvement. For this reason there has been chosen a specific embodiment of the remotely actuated back spot facing tool as adopted for use with a boring or like machine and showing a mechanical and a hydraulically actuated means for opening and concealing the cutting blade.

This specific embodiment and an alternate embodiment have been chosen for the purposes of illustration and description as shown in the accompanying drawings wherein:

BRIEF DESCRIPTION OF THE DRAWINGS

In the following description and in the claims various details will be identified by specific names for convenience; these names, however, are intended to be generic in their application. Corresponding reference characters refer to like members throughout the several figures of the drawings.

Figure 4:
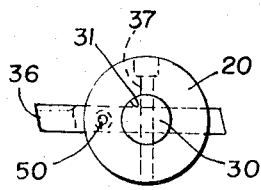
FIG. 4 represents an end view of the tool as taken on the line 4—4 of FIG. 2 and looking in the direction of the arrows.

The drawings accompanying, and forming part of, this specification disclose certain details of construction for the purpose of explanation of the broader aspects of the invention, but it should be understood that structural details may be modified without departure from the concept of the invention and that the invention may be incorporated in other structural forms than shown.

DESCRIPTION OF THE MECHANICAL EMBODIMENT OF FIGS. 1 THROUGH 4

Referring now to the drawings and in particular to the tool as shown in FIGS. 1 through 4, there is depicted a side view of a mechanically actuated back spot facing tool. In this tool a spindle body 20 is removably retained by a coupling 22 removably secured to a shank member 24. This shank may be tapered for mounting in a conventional spindle of a boring machine, not shown, and when so mounted is rotated positively with the rotation of said spindle of the boring machine or drill press or the like. A positive drive is established between spindle body 20 and shank member 24 by a key or dove-tail engagement or assembly 25 which occurs with coupling 22. Slidably carried on the outer diameter of spindle body 20 is a collar 26 which is movable to two limits of movement and by means of a spring urged ball 27 is retained in the forward position by groove 28 and in the rearward position by a like groove 29. A cam rod 30 is slidably carried in an axial bore 31 in spindle body 20. A connecting pin 32 is slidable in a slot 33 formed in and through the body 20 and this pin passed through a retaining hole in rod 30. The slot 33 is positioned and is of a sufficient extent to permit the collar 26 to be moved to its limits as established by ball 27 and grooves 28 and 29 while the rod is moved by pin 32 to a like extent.

Figure 3:
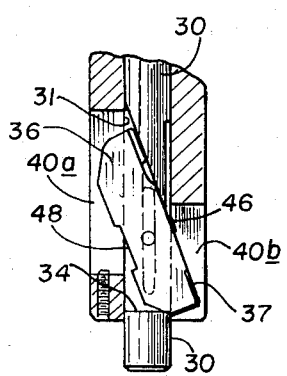
FIG. 3 represents a fragmentary side sectional view of the distal end as in FIG. 2 but with the cutting blade moved to its retracted or concealed condition and in position for either insertion or withdrawal of the spindle body and blade through the bore or hole through which is passed the boring tool spindle body.
Figure 2:
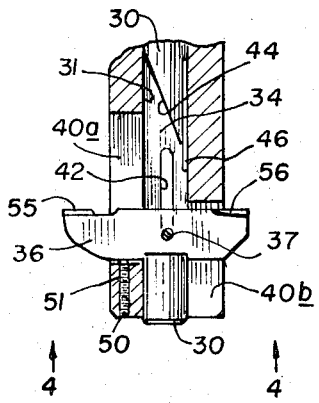
FIG. 2 represents a fragmentary side sectional view of the distal end of FIG. 1 and showing the cutting blade moved to an open or cutting condition.
Figure 1:
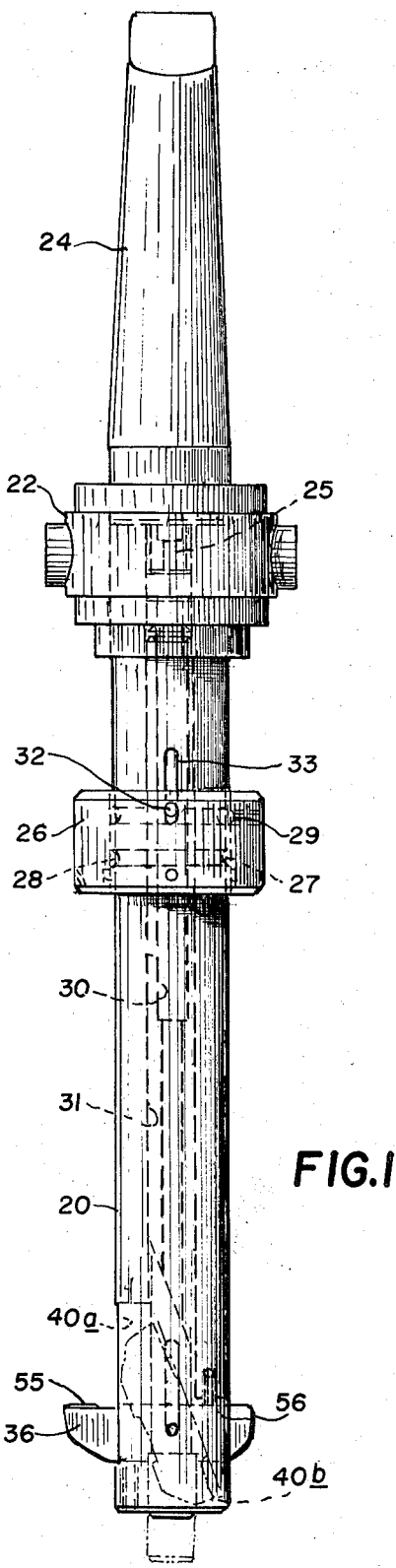
FIG. 1 represents a side view of a back spot facing tool which is mechanically actuated with the movement of a rod to cause the cutting blade tool to be released and swung into a spindle body and when the rod is actuated to its other limit the tool blade is opened and locked for the back spot facing operation to be accomplished.

Rod 30 as seen in FIGS. 2 and 3 has its forward end formed with a slot 34 which is sized to slidably retain the sides of a cutting blade 36. This blade is pivotally retained by a screw 37 which is secured in the spindle body 20. As seen in FIG. 4, this screw is a cap screw carried in a countersunk and threaded hole formed in the body 20. The central portion of the screw passes through a hole in the blade to pivotally retain this blade. Also formed in body 20 is a slot 40 which is a sliding fit for the cutting blade 36. As seen in FIGS. 1, 2 and 3, this slot 40 is an offset slot with the portion 40a depicted as the upper portion being disposed so as to receive that blade portion of blade 36 which is rotatably moved toward shank 24 and into concealed condition in body 20 when collar 26 is moved away from shank 24. At this time the other portion of blade 36 swings into and is stored in slot portion 40b which as seen in FIG. 2 extends from a short distance to the right of the open blade 36 to and through the distal left end of body 20.

The rod 30 has a longitudinal clearance slot 42 formed in the two portions which extend along the blade slot 34. This clearance slot 42 is adapted to permit movement of rod 30 in the bore 31 without interference or resistance of the pin 37. The slot 34, as formed in rod 30, has that portion 44 toward shank 24 formed at a slope of about thirty degrees to the side of the rod. Carried on side of the rod 30 and extending forwardly of the fore or left end of the slope 44 is a spring finger 46 for a use to be hereinafter more fully described. On the back side of blade 36 is formed a notch 48 which is sized so as to be entered and engaged by the inner end of the distal portion of rod 30 which forms the termination of slot 34.

Carried in the body 20 and in the distal end portion opposite slot portion 40b is a set screw 50 which is adjustably movable in a threaded hole 51 formed in the body.

USE AND OPERATIONAL OF THE TOOL OF FIGS. 1 THROUGH 4

To use the back spot facing tool as shown in FIGS. 1 through 4 it is necessary that shank 24 be connected to body 20 by means of collar 22. The shank 24 is then mounted in the socket of a spindle of the drilling or boring machine with which it is to be used. In mounted condition, the back spot facing tool has the blade 36 turned to the condition of FIG. 3 by moving collar 26 toward the distal end of the body 20. As the connected rod 30 is moved downwardly, spring 46 engages the pivoted blade 36 at the lower side of pivot screw 37 causing blade 36 to rotate clockwise around screw 37. The spring 46 slides along the face of the blade 36 until angle slope 44 engages the blade which, of course, terminates the downward movement of rod 30. At this blade position the collar 26 is in the forward position and ball 27 is in retaining groove 28. With the blade 36 brought to the concealed condition as in FIG. 3, the body 20 may be moved into and through the hole or bore which is to be back spot faced.

After the body and concealed blade 36 have been passed through the hole or bore to be spot faced, blade 36 is swung counterclockwise to the open condition of FIG. 2. This is simply accomplished in this tool by manipulation and movement of collar 26. Collar 26 is grasped by the operator and is moved upwardly to cause ball 27 to move from groove 28 to groove 29. The solid plug end of rod 30 which is to the bottom of blade 36 moves from its clearance condition of FIG. 3 to the condition of FIG. 2 wherein it enters notch 48 to retain blade 36 in the condition of FIG. 2 with the inner end of screw 50 engaging the larger extending blade portion on its back surface to maintain this blade in its selected position.

After the back spot face operation has been completed the tool is advanced further into the hole through which it extends. This permits the cutting blade 36 to be freely swung into the concealed condition of FIG. 3. The swinging of the blade is accomplished by the operator grasping the collar 26 and moving the collar downwardly or toward the blade-mounted distal end. After a very short movement the plug end of the rod 30, which was in retaining engagement with the notch 48, is removed from this notch and as the rod 30 progresses downwardly the spring 46, as above-described, engages the short side of the blade 36 which carries the cutting edge 56. As the spring proceeds downwardly it causes the blade 36 to be moved clockwise arund the screw 37. As the rod 30 progresses further downwardly the blade 36 is swung into the condition of FIG. 3, which condition is maintained when collar 26 and its ball 27 is moved to bring this ball into stop groove 28. With the ball 27 moved into said groove 28 it retains the collar at the forward position after which the tool with the blade concealed may be withdrawn through the access hole in the workpiece. The tool remains in this condition until the next workpiece has been positioned or another hole in this same workpiece has been brought into alignment with the spindle carrying this tool and at the position where the spot facing is to be accomplished. The spot facing is then accomplished with the above procedure again repeated.

HYDRAULICALLY ACTUATED TOOL BACK SPOT FACING TOOL OF FIGS. 5 THROUGH 8

Referring now to the drawings and FIGS. 5 through 8 and an alternate embodiment shown, this alternate embodiment of the tool is similar to the back spot facing tool of FIG. 1 except the actuation of this back spot facing tool is accomplished by means of hydraulic and/or air pressure. A shank member 60 is of a tapered construction similar to that in FIG. 1 and formed in the small end of this shank is threaded retaining means 61 which is engaged by a drawbar of the machine tool to cause the tapered shank to be drawn into a seated condition in the spindle of said machine tool in which the back spot facing tool is mounted. A spindle body 62 is releasably secured in a collar connecting portion 64 by means of set screws 66. These set screws, in securing position, enter into retaining notches 67 formed in the body 62. Formed in the collar portion 64 is air inlet 68 and hydraulic inlet 69. Air is fed to inlet 68 to actuate a piston 70 carried on the end of a cam rod 72.

Figure 5:
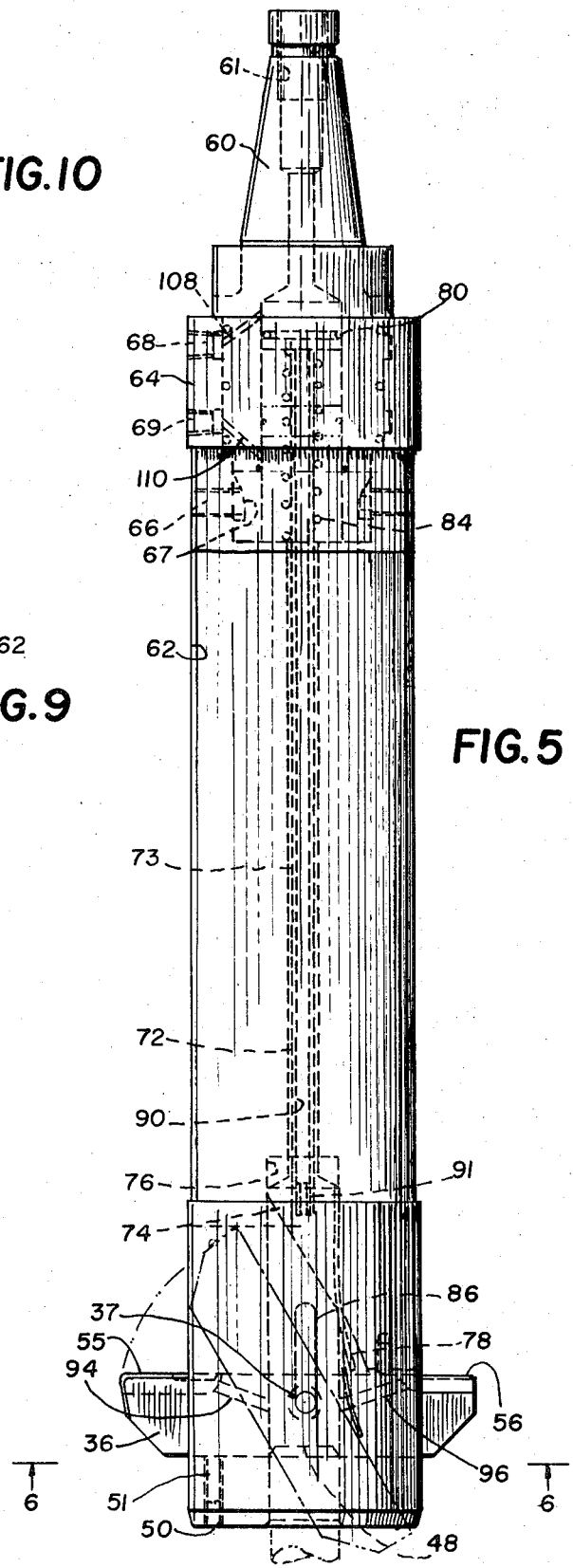
FIG. 5 represents a side view of an alternate tool construction of a spot facing tool like the tool of FIG. 1 but with the actuation of the axially moved rod accomplished by a cylinder moved in response to pressurized fluid.

This rod 72 is slidable in a bore 73 formed in the spindle body 62. The lower end of this rod is secured to a cam ramp portion 74 which is slidably retained in an enlarged bore 76 formed in the body 62. The mid-portion of the cam ramp portion 74 has a slot formed therethrough with the right end of the slot sloped at an angle of about thirty degrees. Extending beyond the end of the ramp is a spring finger 78 secured to portion 74, this spring finger actuates the cutting blade 36 in the same manner as in FIG. 1. Piston 70 carries and has mounted thereon an O-ring 80 which is slidable in a bore 82 formed in the shank 60. A compression spring 84 engages the left face or end of piston 70 and the other end of this spring engages a shoulder within the bore 73 in the spindle body 62. This compressed spring causes the piston 70 to be urged righwardly to the condition as seen in FIG. 5.

Figure 6:
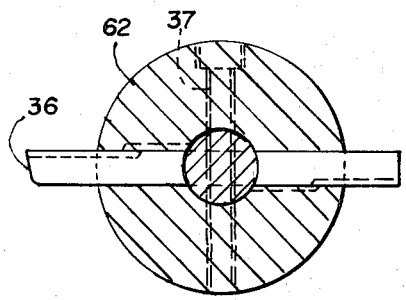
FIG. 6 represents a partly diagrammatic view taken on the line 6—6 of FIG. 5 and looking in the direction of the arrows and with the back spot facing blade shown in its open condition.

As in the case of the tool of FIG. 1, a set screw 50 is carried in threaded hole 51 so as to engage and establish the rear stop or positioning of the cutting blade 36 when in its cutting condition. As seen in FIG. 6, pivot screw 37 passes through a pivot bore in the blade 36 and is retained in a threaded bore in the body 62. A slot 86 formed in the side walls on both sides of slot 77 permits cam rod 72 to be moved axially back and forth while passing the screw 37. Cam rod 72 is formed with a coolant passageway 90 having a reduced diameter discharge end 91 and with the other end-fluid connected to inlet 69. Fluid conducting grooves 94 and 96 are provided either in the face of the cutter 36 or in the body 62 so as to direct a pressurized fluid carried through the passageway 90 onto and against the carbide inserted cutting edge portions 55 and 56 used with the cutting blade 36.

USE AND OPERATION OF THE TOOL OF FIGS. 5 THROUGH 8

Figure 8:
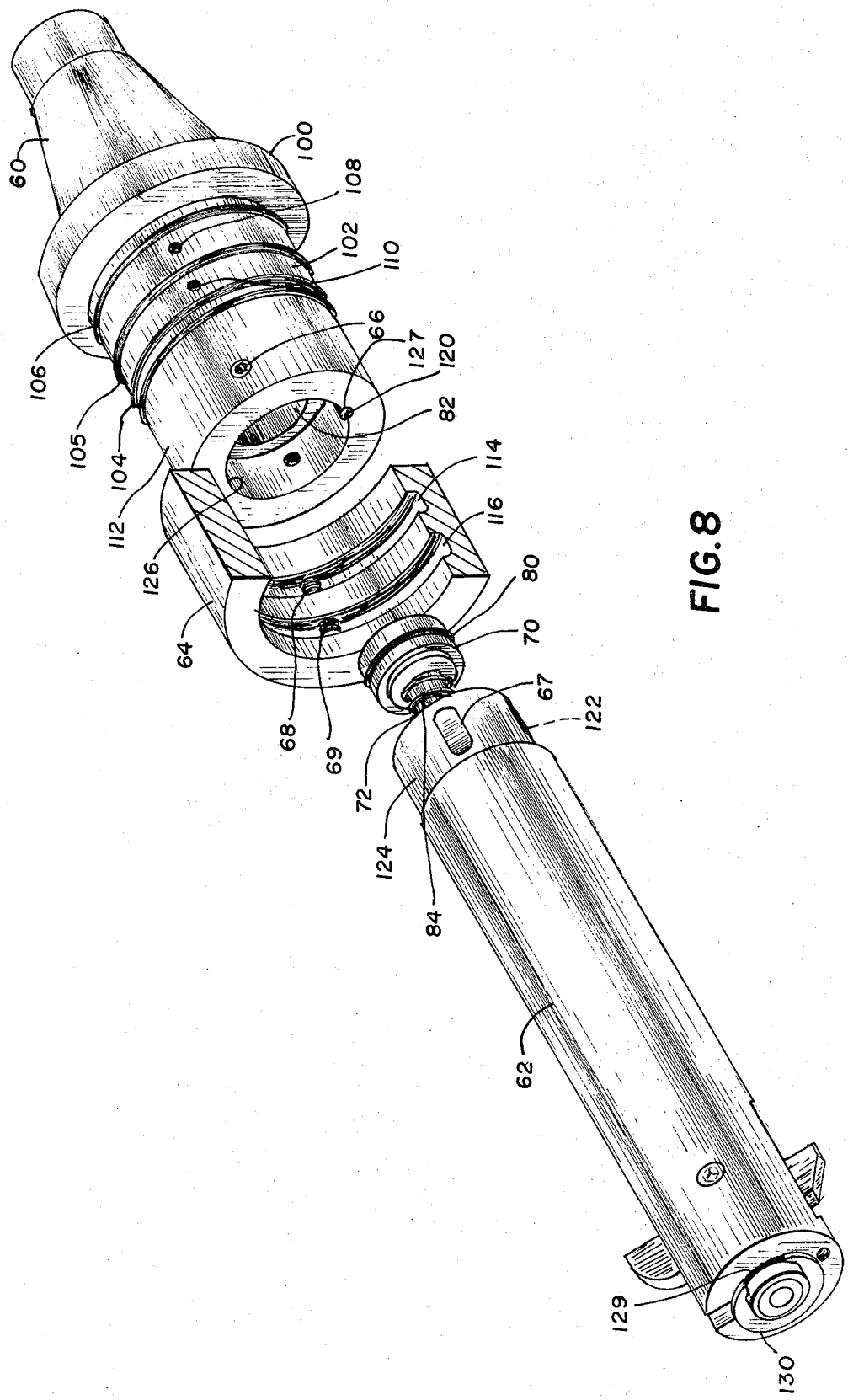
FIG. 8 represents an exploded isometric view, partly in section and showing the relationship of the components of the tool of FIG. 5.

The arrangements of the components of the tool of FIGS. 5 through 8 is best seen in FIG. 8 and includes the shank 60 which in addition to collar portion 100 has disposed upon a shoulder surface portion 102 three O-rings identified as 104, 105 and 106. These rings are nested in spaced grooves formed on portion 102 so as to seal the flow to the passageways connected to angular conducting passageways 108 and 110. Collar connection 64 is mounted on shoulder surface 112 formed on the shank 60 and by means of set screws, not shown, is retained thereon. Groove 114 is adapted to carry air from inlet 68 into groove 114 while cutting fluid from inlet 69 is fed into groove 116. The air in groove 114 is fed into hole or passageway 108 and the fluid in groove 116 is fed into passageway 110. The piston 80 is brought into the passageway 82 and alignment of shank 60 and spindle body 62 is achieved by means of a round key 120 fitted into a slot 122 in reduced portion 124. The spindle body 62 is slid into a nesting recess 126 formed in the spindle shank 60. Key 120 is carried in a groove 127 in recess 126 formed in the shank portion 60.

Set screws 66 are carried in threaded holes in spindle body 62 and when tightened enter into the angled notches 67 formed in the reduced portion of the shank portion 124 to retain this shoulder portion 124 in the seat portion 126. Spring 84 is disposed to push the piston portion 70 rightwardly toward the shank end to the condition in which the outer blade 36 is oriented as seen in FIGS. 5 and 8. In its most righward movement of rod 72 the cam ramp portion 74 of this rod is disposed to enter the notch 48 in the cutter blade 36.

It is also to be noted in FIG. 8 that the rightward extending portion of the rod 72 has a groove 129 formed adjacent the end thereof which permits the rod portion 74 to be extended out of the bore a short distance which is sufficient for a C-ring 130 to be slipped in the groove 129. The pressure on the piston 70 to urge the rod end 72 outwardly is then released so that the tension of the spring 84 is utilized to hold the rod in a semi-extended condition against the stop shoulder provided by the C-ring 130 which then permits the retaining screw 37 to be removed from the body and the cutter blade 36 to be removed for sharpening or replacement.

Figure 10:
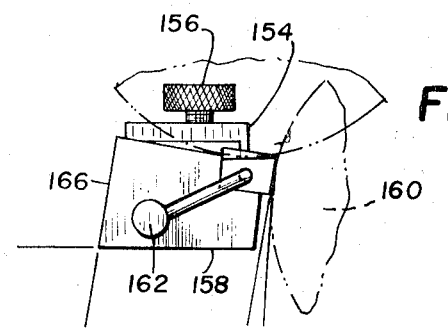
FIG. 10 represents an end view of the grinding jig of FIG. 9, this view taken on the line 10—10 thereof and looking in the direction of the arrows.
Figure 9:
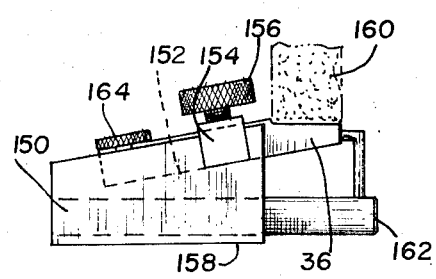
FIG. 9 represents a side view of a grinding jig by which the cutting blade of the tool may be precisely ground to a determined angle.
Figure 7:
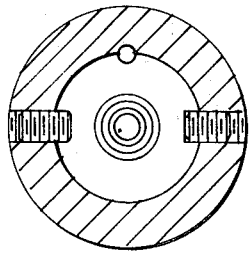
FIG. 7 represents a sectional view taken on the line 7—7 of FIG. 5 and showing a preferred means for retaining the spindle body of the cutting tool in a collar portion of the shank end of the tool.

CUTTING BLADE GRINDING FIXTURE OF FIGS. 9 and 10

Referring finally to FIGS. 9 and 10 there is depicted a grinding fixture in which the blade 36 is held as it is precisely sharpened. This fixture is designed to grasp the blade on one of its flat sides and to engage one of its edges. By a clamp means the blade 36 is held without regard to its pivot point. As seen in FIGS. 9 and 10, the base 150 is formed with an angled support surface 152 upon which the blade is supported while being gripped. Against this surface and a shoulder the blade 36 is retained by a clamp arm 154 which is tightened into position by a thumb screw 156. The base 150 as seen in FIG. 9 is placed with its surface 158 upon the magnetic chuck of the grinder and grinding wheel 160 is then brought to the top of the cutting edge of blade 36 to provide a definite cutting angle with respect to the base of flat faces of the blade 36.

A positioning finger 162 is adjustably retained by means of a clamp screw 164 so as to be slidable in and out of a bore formed in the base 150. The end of finger 162 is positioned to establish a stop for the end of the blade 36 when it is reversed end for end for the sharpening of the other end of the blade. To grind the other or front face of the cutting edge of the blade 36 the fixture is turned from surface 158 to surface 166 whereupon the cutting wheel 160 as seen in FIG. 10 is used to grind the other angle or face of the cutting edge of the blade 36. By establishing the position of the stop 162 the manipulating of the thumb nut 156 enables the clamp 154 to be loosened and the blade 36 to be reversed end for end. The established angles on base 150 enable to the two surfaces establishing the cutting edges of one blade end to be accomplished without removal of the blade from the fixture. This enables a dull edge to be dressed to re-establish a cutting edge by grinding the faces of the blade edge although the blade is off-set as to its pivoted condition. Back spot facing tools generally have their cutting edges formed with a radially negative rake and an axially positive angle to roll the chips outwardly and to reduce chatter. The angles established by supporting surfaces 158 and 166 of the fixture seen in FIG. 9 and 10 provide the precise grinding for the edges 55 and 56 of blade 36, the grinding being achieved by a surface grinder grinding the top surface and with only eye alignment.

The blade used in the fixture of FIG. 1 or FIG. 5 needs be sized and sharpened in accordance with its use. Either of the two embodiments may be used for a selected machine tool. The blade 36 is readily removed from either assembly and a newly sized and/or ground blade inserted to perform the desired spot face step. A grinding fixture is used for each cutting edge angle selected. This angle is a compound angle selected to most efficiently machine the material by which the workpiece is composed. For example, cast iron would usually require a different blade sharpening angle than for brass, aluminum, steel and other material and vice-versa.

Terms such as "left," "right," "up," "down," "bottom," "top,'"'front," "back," "in," "out," "clockwise," "counterclockwise" and the like are applicable to the two embodiments shown and described in conjunction with the drawings. These terms are merely for the purposes of description and do not necessarily apply to the position in which the back spot facing tool may be constructed or used.

While a particular embodiment of this tool and the means for sharpening the blade have been shown and described it is to be understood the invention is not limited thereto since modifications may be made within the scope of the accompanying claims and protection is sought to the broadest extent the prior art allows.

What is claimed is:

1. A back spot facing tool actuated by a rod means and adapted to be mounted and carried in the spindle of a machine tool and while so mounted the blade of the tool may be selectively moved from an open to a shielded condition, said tool including: (a) a shank member adapted for mounting in the spindle of a machine tool; (b) a spindle body fixedly attached to said shank so as to be rotated therewith, said spindle body having a longitudinally disposed bore extending inwardly from its distal end and for a selected distance; (c) a cam rod slidably carried in this spindle body bore, this rod having its distal end portion formed with a first longitudinal slot formed intermediate its ends; (d) a second longitudinal slot formed in both outer walls of the distal portion of the spindle body, the first and second longitudinal slots when the cam rod is movably mounted in the spindle body bore being aligned and maintained in said alignment to provide a transverse passageway of a selected width; (e) a blade supporting pin removably carried in a transverse hole formed in the outer side wall portions of the spindle body which extend along the second longitudinal slot; (f) a back spot facing blade having a hole therethrough by and on which the blade is pivotally retained on said pin, the hole in this blade being positioned so that the mounted blade in cutting position has one exposed cutting edge of a greater extent than the other edge, the blade further having a thickness which is sufficiently less than the width of the first and second slots to permit free rotation of the blade in and out of said slots; (g) a third longitudinal slot whose axial plane is transverse to the first longitudinal slot, this third slot formed in each of the side wall portions of the cam rod extending along the first slot, this third slot sized and positioned to slidably pass by the mounted blade supporting pin during back and forth longitudinal movement of the cam rod past said pin; (h) a cam means formed on and at one of the ends of the first longitudinal slot in the cam rod, the forward end of this means when brought into engagement with a first longitudinal edge of the blade engaging the blade at a position a short distance transversely from the pin hole in the blade, this forward end as the rod is further advanced as a first movement engaging the blade and causing the blade to be rotated on the pin until the blade is brought to a shielded condition in the spindle body, said first slot having its other end formed with means for engaging the second and opposite longitudinal edge of the blade when and as this end of the slot is brought against this second edge of the blade during movement of the cam rod which is counterflow to the first movement, said second movement when continued causing the cam means to move from engagement of the first edge of the blade while the other end engaging means urges the blade to a transverse spot facing position; (i) an adjustable stop carried by the spindle body and adapted to engage the blade to limit its rotation to an open condition to bring the blade to a selected cutting position, and (j) means for selectively retaining the cam rod at determined longitudinal movement positions which correspond respectively to the blade cutting and blade concealed conditions.

2. A back spot facing tool as in claim 1 in which the cam rod is manually moved and is retained in blade opened and closed positions by a detent means cooperatively formed in the spindle body and a slidable collar member carried on the spindle body.

3. A back spot facing tool as in claim 1 in which the cam rod is moved by hydraulic means in which a piston is attached to the cam rod, the piston moved by pressurized air, cutting fluid and the like.

4. A back spot facing tool as in claim 3 in which the piston is moved toward the blade by pressurized fluid and is moved away from the blade by a spring bias means, and in which the cam rod is formed with a cutting fluid passage terminating at the first longitudinal slot, and in which there is provided fluid passageways leading from said slot to the cutting edges of the blade.

5. A back spot facing tool as in claim 1 in which the forward end in the first longitudinal slot is an angled surface of about thirty degrees to the axis of the cam rod and this angle surface provides a cam means which is at the end of the slot toward the shank member.

6. A back spot facing tool as in claim 5 in which the edge of the blade opposite the cutting edge portions is formed with a notch into which the end surface of the first longitudinal slot of the cam rod opposite the angled surface is sized and disposed to enter and engage, said notch to position the blade in cutting condition.

7. A back spot facing tool as in claim 1 in which the second longitudinal slot formed in the spindle body terminates at one side wall portion to provide a substantially transverse face and into and through this face portion extends the adjustable stop which is a set screw carried in a threaded hole, the set screw being rotated to provide the desired stop position of the blade, the set screw engaging that blade portion having the greater cutting edge extension.

8. A spot facing tool as in claim 5 in which a spring finger is secured to the cam rod so as to extend beyond the angled surface and to provide a flexible forward end of said angled cam means.

9. A spot facing tool as in claim 1 in which the blade has its hole for mounting on the pin positioned at an unequal distance from the ends of the blade.

10. A spot facing tool as in claim 9 in which the blade has the rear corner which is engaged by the cam rod to urge the blade into cutting condition formed with a contour as by rounding, leveling and the like so that the means for engaging the blade engages this contoured corner as a smooth cam surface providing an easy rotation of the blade.

* * * * *